Figure 1:
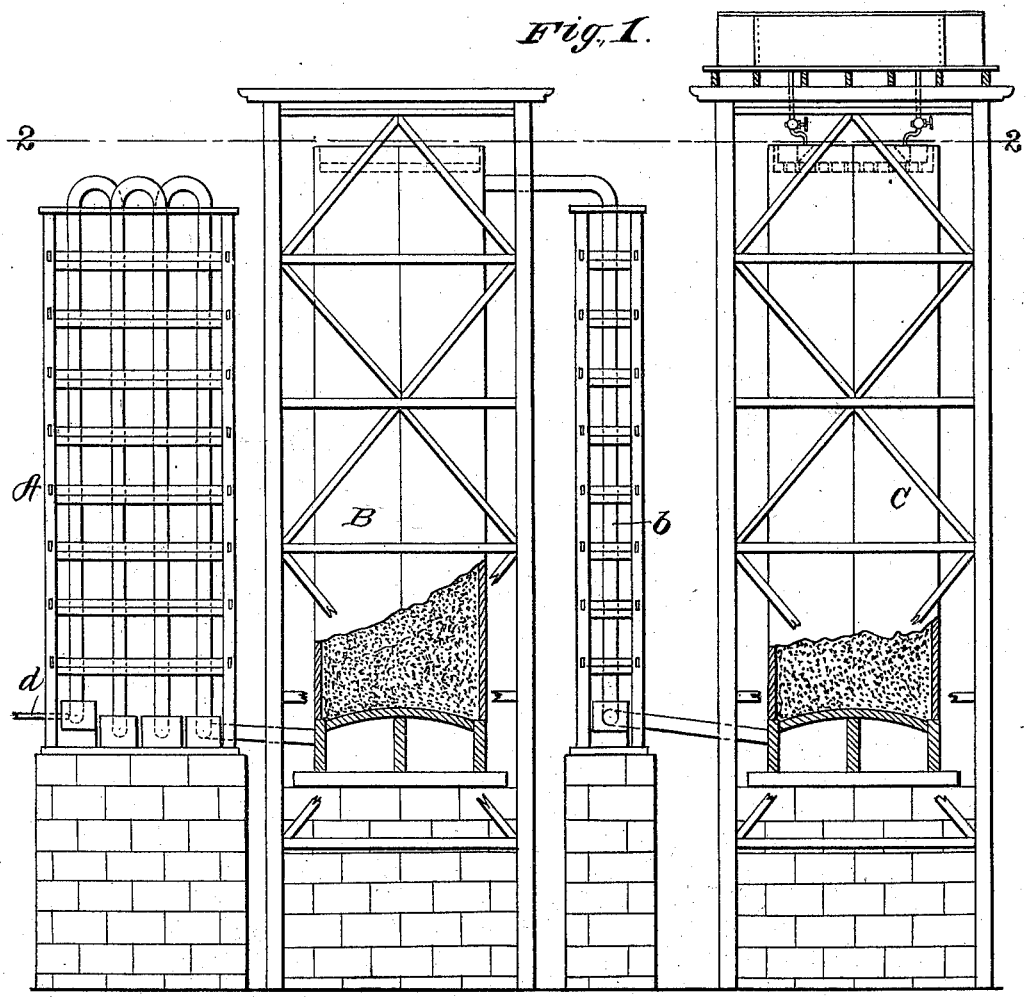

(No Model.)

J. R. WYLDE & J. W. KYNASTON.
PROCESS OF MAKING HYDROCHLORIC ACID.

No. 605,369. Patented June 7, 1898.

Witnesses
Inventors

UNITED STATES PATENT OFFICE.

JOSIAH R. WYLDE AND JOSIAH W. KYNASTON, OF LIVERPOOL, ENGLAND, ASSIGNORS TO THE UNITED ALKALI COMPANY, LIMITED, OF SAME PLACE.

PROCESS OF MAKING HYDROCHLORIC ACID.

SPECIFICATION forming part of Letters Patent No. 605,369, dated June 7, 1898.

Application filed October 26, 1897. Serial No. 656,445. (No specimens.)

*To all whom it may concern:*

Be it known that we, JOSIAH RIGBY WYLDE, alkali manufacturer, and JOSIAH WYCKLIFFE KYNASTON, analytical chemist, subjects of the Queen of Great Britain and Ireland, and residents of G 11 Exchange Buildings, Liverpool, in the county of Lancaster, England, have invented certain Improvements in the Manufacture of Hydrochloric Acid Free from Arsenic, of which the following is a specification.

This invention has for its object to produce hydrochloric acid free from arsenic from the gases evolved in the treatment of common salt with ordinary arsenical sulfuric acid or other gases wherein hydrochloric-acid gas is present contaminated with arsenic, such as the gases technically known as "roaster-gas"—that is, the gases evolved during the calcination process in making sulfate of soda—or the gases evolved during the calcination of a mixture of bisulfate of soda or niter-cake with common salt. Our invention is based upon the discovery which we have made that when such gases are passed over or through a porous or equivalent material, such as coke or the like, (ordinary hydrochloric-acid-condensing towers packed with the said material are suitable for the purpose,) under suitable conditions, as hereinafter described, with regard to temperature the comparatively small quantities of the hydrochloric-acid gas and steam or vapor of water, which condense to liquid acid in the vessel or tower containing the coke or the like, absorb and retain in solution the whole or nearly the whole of the arsenic, while the bulk of the hydrochloric-acid gas which is incondensed in and leaves the said vessel or tower is practically free from arsenic. We term the said vessel or tower so used a "dry" tower to distinguish it from condensing-towers in which a stream of water or other liquid meets the ascending gas. No water or other liquid is run down our dry tower, but the arsenic is, as aforesaid, abstracted from the gases and retained in solution by the portion of liquid acid always condensed under the said conditions by reason of the aqueous vapor contained in the gaseous mixture. If chlorin be present in the gaseous mixture, the arsenic is partially or wholly converted into a form which is much more soluble and less volatile than is the form in which it is usually present, and therefore if chlorin be not present in the gases it may be added thereto, although if arsenic be present in only small quantity or if the water-vapor be in sufficiently large proportion its use is not essential. The action of chlorin in facilitating the removal of arsenic from hydrochloric-acid gas is due to the conversion of the arsenious chlorid, which is very easily volatilized, into arsenic oxid, which is non-volatile, as indicated by the equation:

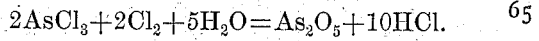
$$2AsCl_3 + 2Cl_2 + 5H_2O = As_2O_5 + 10HCl.$$

We may carry out our invention as follows: We take, for example, the acid gases obtained by the decomposition of common salt by treatment with the ordinary arsenical sulfuric acid, and we convey the said gases as they are evolved through a length of pipes sufficient to cool the said gases considerably. We find that a temperature in the tower not exceeding 55° centigrade gives good results, but lower temperatures are preferred. The gases when sufficiently cooled are passed into the aforesaid dry tower. If chlorin be not already present, we introduce it by inserting into the pipe by which the gases pass into the said dry tower and at or near the point of entry into the said tower a jet conveying chlorin gas, and we regulate the supply of the said chlorin gas so that it is present in the gases passing from the dry tower in the least possible excess. In passing through the dry tower the arsenic is removed from the said gases, as aforesaid, and retained in the liquid acid produced. The gas issuing from the dry tower and now freed from arsenic is conveyed by a pipe or pipes from the top of the dry tower to the bottom of a condensing or wet tower, down which a stream of water (or a weak acid solution) is passed, and the gas being condensed in this tower we obtain in the form of an aqueous solution free from arsenic the greater part of the hydrochloric acid evolved from the decomposed salt. We proceed in a similar manner with the other gases named.

The gases obtained in the manufacture of chlorin by the Deacon process just as they issue from the decomposer and consisting of chlorin and hydrochloric-acid gas, together with aqueous vapor, nitrogen, and small quantities of other gases, and also containing arsenic, can also be treated as hereinbefore described; but of course no chlorin will be added in this case.

Where chlorin has been present as an essential constituent of the gases or has been added thereto in slight excess, the liquid hydrochloric acid produced is not only free from arsenic, but is also free, or nearly free, from sulfuric acid. It may, however, contain a minute quantity of free chlorin in solution; but this can easily be removed by passing a current of air through the cold acid, which removes the chlorin without adding to the acid any other element of contamination; but for many purposes the acid may be freed from chlorin, if its presence be objectionable, by the addition of a deoxidizing substance, such as ferrous chlorid or sulfate.

In the accompanying drawings we have illustrated an apparatus suitable for carrying out the process above set forth.

Figure 2:
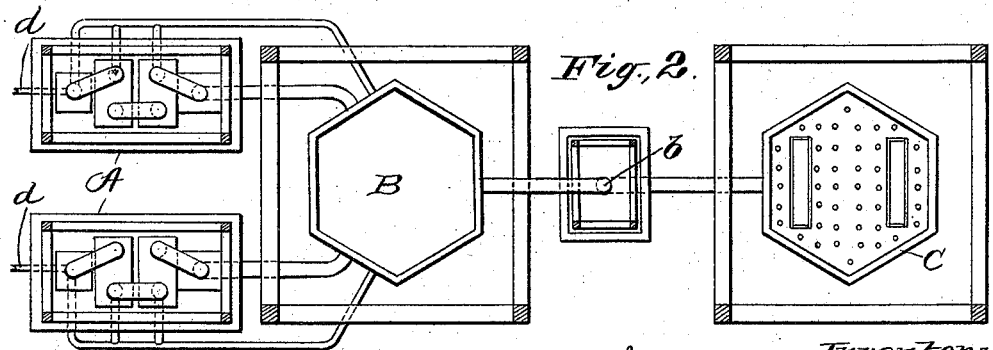

In said drawings Figure 1 is an elevation, partly in section; and Fig. 2 is a horizontal sectional view on line 2, Fig. 1.

Referring to the drawings, A A represent two sets of cooling-pipes, into which the arsenical hydrochloric acid from which the arsenic is to be removed is first introduced. Two sets of pipes are shown for use when the gas is obtained from two sources in quantity not too large for condensation in one condenser. Either or both sets may be used, as the quantity of gas to be treated is great or small. From the cooling-pipes the gas passes into and upwardly through the dry coke-tower B, where arsenic is removed therefrom in the manner already described. From the top of said tower the gases pass downwardly through pipe $b$ to the bottom of condensing-tower C of suitable construction.

$d\ d$ are pipes through which a small jet of chlorin gas is added to the arsenical hydrochloric-acid gas, when desirable, before the latter enters the dry coke-tower.

Having described the nature of our invention and the manner in which it is to be performed, we claim—

The process of manufacturing hydrochloric acid free from arsenic from gases evolved by the treatment of an alkaline chlorid with ordinary arsenical sulfuric acid or the gases known as "roaster-gas," or the gases evolved during the calcination of a mixture of bisulfate of soda with common salt, consisting in first cooling the said gases, and then passing them in the presence of chlorin through or in contact with coke, in a "dry tower" in which the arsenic is retained, and thence to a wet tower, in which the hydrochloric acid is condensed, substantially as hereinbefore described.

In testimony whereof we have signed our names to this specification in the presence of two subscribing witnesses.

J. R. WYLDE.
J. W. KYNASTON.

Witnesses:
WM. PIERCE,
S. MCCREADY.